United States Patent
Yanagida et al.

(10) Patent No.: US 6,791,657 B2
(45) Date of Patent: Sep. 14, 2004

(54) LIQUID CRYSTAL DISPLAY HAVING LIQUID CRYSTAL CELL GAP VARIATION

(75) Inventors: Toshiharu Yanagida, Tokyo (JP); Toru Udaka, Kanagawa (JP); Masaru Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 09/947,120

(22) Filed: Sep. 5, 2001

(65) Prior Publication Data

US 2002/0097369 A1 Jul. 25, 2002

(30) Foreign Application Priority Data

Sep. 6, 2000 (JP) ...................................... P2000-269446

(51) Int. Cl.[7] ........................ C09K 19/60; G02F 1/1337; G02F 1/1345
(52) U.S. Cl. ........................ 349/165; 349/130; 349/155
(58) Field of Search ................................. 349/130, 155, 349/165

(56) References Cited

U.S. PATENT DOCUMENTS

| | | | |
|---|---|---|---|
| 4,387,965 A | 6/1983 | Hara | 350/349 |
| 4,702,561 A | 10/1987 | Huffman | 350/349 |
| 5,963,288 A | * 10/1999 | Sato et al. | 349/154 |
| 6,108,057 A | * 8/2000 | Kusanaga | 349/40 |

FOREIGN PATENT DOCUMENTS

| | | |
|---|---|---|
| EP | 01121301.4 | 3/2002 |
| GB | 2314423 | 12/1997 |
| WO | WO97/39382 | 10/1997 |
| WO | WO99/34251 | 7/1999 |

* cited by examiner

Primary Examiner—Long Pham
Assistant Examiner—Howard Weiss
(74) Attorney, Agent, or Firm—Robert J. Depke; Holland & Knight LLP

(57) ABSTRACT

A light control device includes a GH cell and a polarizer wherein a host material is made of a negative type liquid crystal whose dielectric anisotropy is negative and a guest material is made of a dichromatic positive type dye. The polarizer is provided at a side of light incident on the polarizer. A cell gap ranges from 2 μm to 4 μm, at least, in an effective light path.

10 Claims, 12 Drawing Sheets

F I G. 1
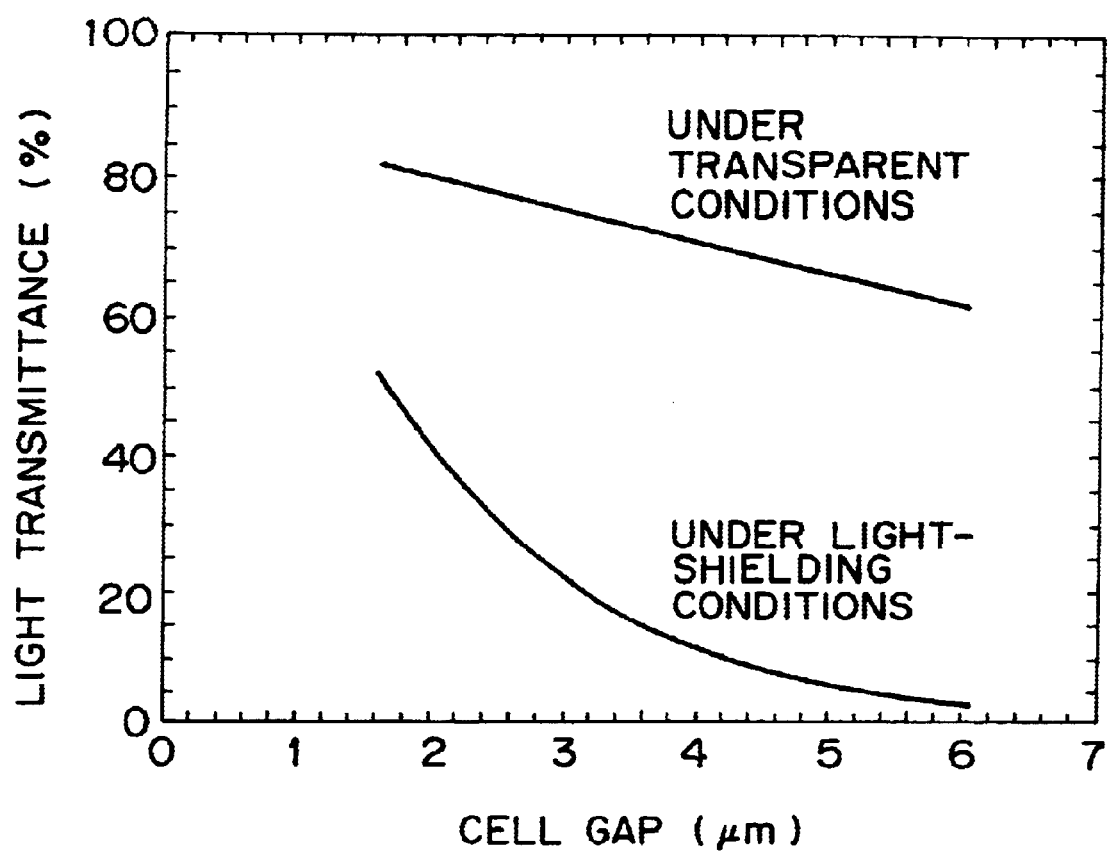

WAVE FORM OF APPLIED VOLTAGE

F I G. 4
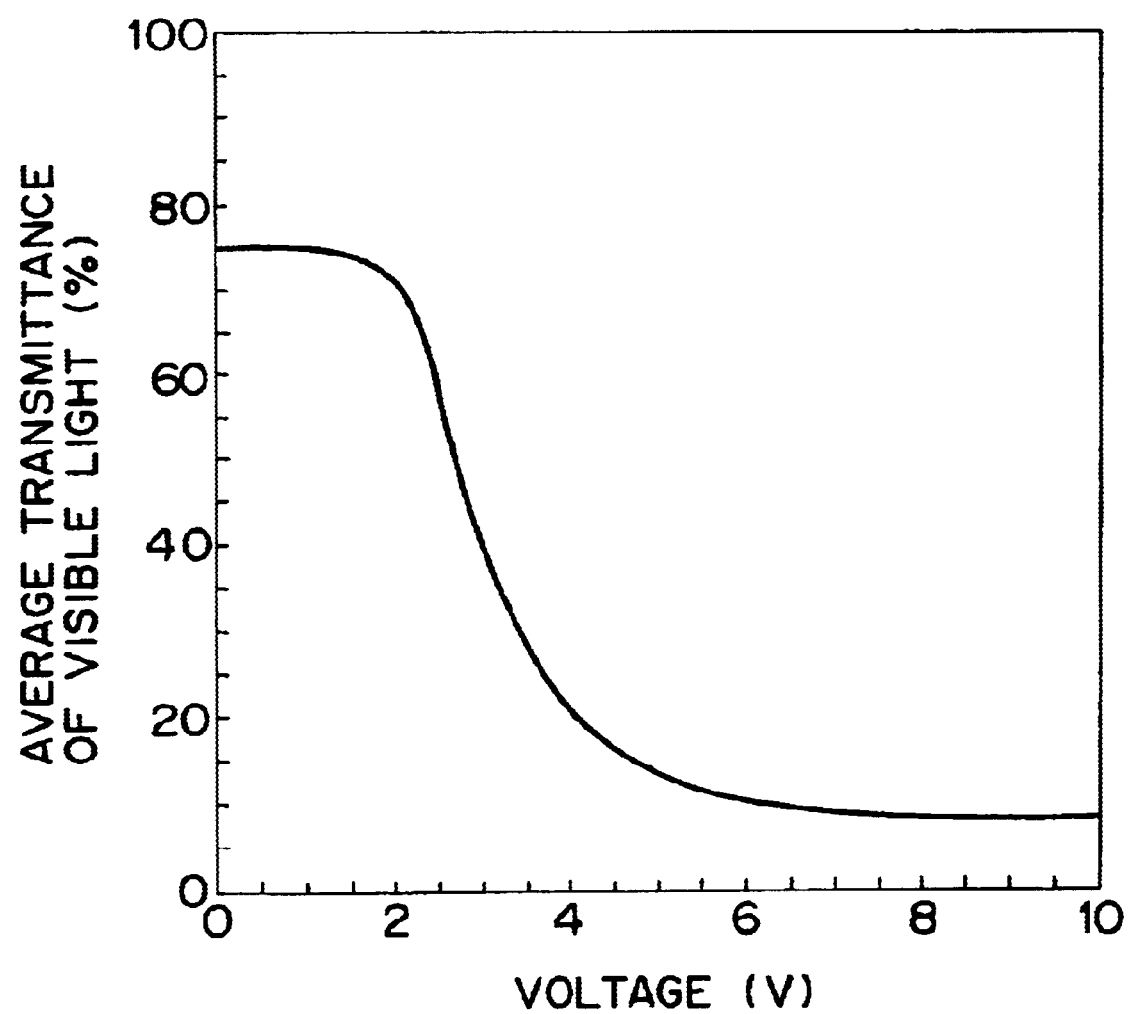

gc < gp

F I G. 14A
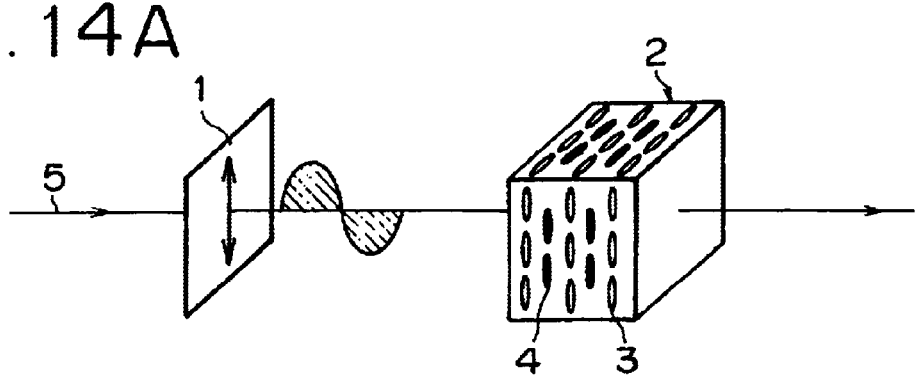
F I G. 14B
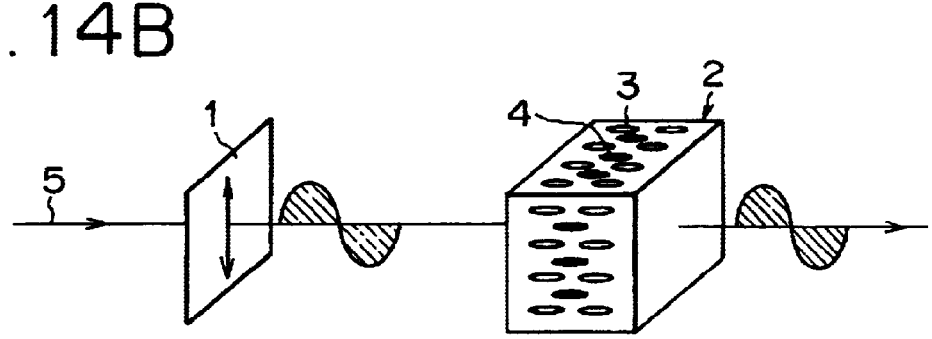
F I G. 15
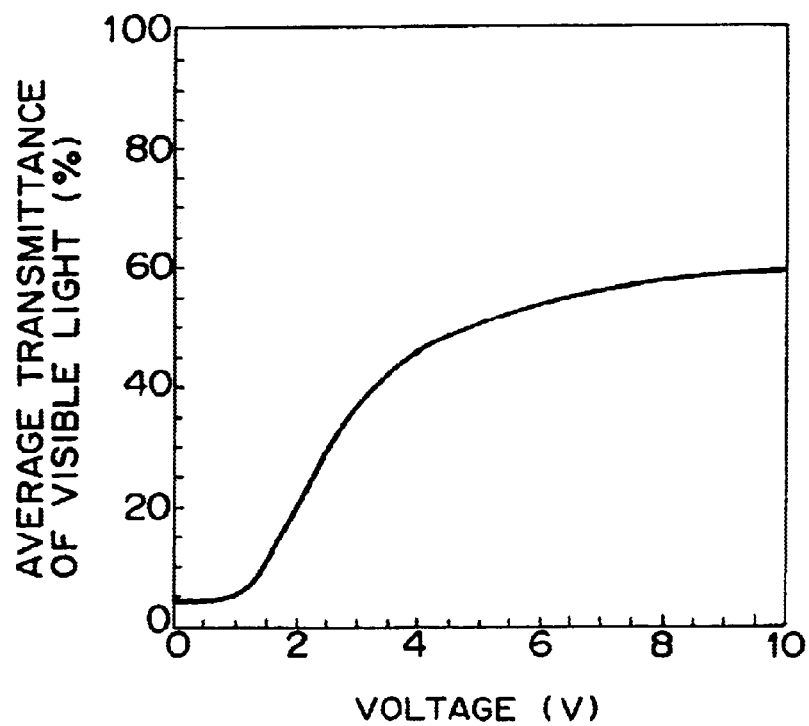

LIQUID CRYSTAL DISPLAY HAVING LIQUID CRYSTAL CELL GAP VARIATION

RELATED APPLICATION DATA

The present application claims priority to Japanese Application(s) No(s). P2000-269446 filed Sep. 6, 2000, which application(s) is/are incorporated herein by reference to the extent permitted by law.

BACKGROUND OF THE INVENTION

This invention relates to a light control device wherein incident light enters thereinto after control in quantity of the light and also to a pickup device using the same.

In general, a polarizer is used in a light control device using a liquid crystal cell. For the liquid crystal cell, there is used, for example, a TN (twisted nematic) liquid crystal cell or a guest-host (GH (guest-host)) liquid crystal cell.

FIGS. 14A and 14B are, respectively, a schematic view showing the working principle of a known light control device. This light control device is constituted mainly of a polarizer 1 and a GH cell 2. The GH cell 2 is sealed between two glass substrates and has working electrodes and liquid crystal alignment films although not particularly shown in the figures. The GH cell 2 has liquid crystal molecules 3 and dichromatic dye molecules 4 sealed therein.

The dichromatic dye molecules 4 have anisotropy with respect to the absorption of light and are made, for example, of positive-type (p-type) dye molecules that absorb light along the major axis of the molecules. The liquid crystal molecules 3 have dielectric anisotropy of the positive type (p-type).

FIG. 14A shows a state of the GH cell 2 in case where no voltage is applied thereto (or under conditions of applying no voltage). Incident light 5 is linearly polarized after transmission through the polarizer 1. In FIG. 14A, the polarization direction and the direction of the major axis of the dichromatic dye molecules 4 are coincident with each other, so that the light is absorbed with the dichromatic dye molecules 4, thereby causing the transmittance of the GH cell 2 to be lowered.

When a voltage is applied to the GH cell 2 as shown in FIG. 14B, the liquid crystal molecules are turned toward a direction of an electric field, under which the direction of the major axis of the dichromatic dye molecules 4 becomes perpendicular to the direction of polarization of the linearly polarized light. Thus, the incident light 5 is transmitted by the GH cell without being absorbed.

It will be noted that where negative type (n-type) dichromatic dye molecules which are capable of absorbing light along the direction of the minor axis of the molecules are used, the light is not absorbed under conditions where no voltage is applied, but is absorbed when a voltage is applied, unlike the case using the positive type dichromatic dye molecules 4.

With the light control device shown in FIGS. 14A and 14B, a ratio between the absorbances under voltage-applying conditions and no voltage-applying conditions, i.e. an optical density ratio, is at about 10. This optical density ratio is two times higher than that of a light control device constituted of the GH cell alone without use of any polarizer 1.

The optical density ratio is influenced by the gap or distance between the two glass substrates constituting the GH cell (hereinafter referred to as cell gap).

More particularly, the greater the cell gap is or the thicker the liquid crystal layer is, the greater the difference becomes between light transmittances under transparent or transmitting conditions and light-shielding conditions. Thus, although the optical density ratio (contrast ratio) can be made great, the light transmittance under transmitting conditions become lower.

When the cell gap is changed, the response speed of a light control device using the GH cell also changes. More particularly, when the cell gap is made greater, the response speed certainly tends to become slower.

Under these circumstances, there is a strong demand for a light control device using a liquid crystal cell, which ensures a great contrast ratio and, at the same time, can realize a rapid response speed.

SUMMARY OF THE INVENTION

It is accordingly an object of the invention to provide a light control device wherein while ensuring a satisfactory optical density ratio (contrast ratio) of a liquid crystal optical element, a liquid crystal optical element that can be driven at such a high response speed as required for a light control device is employed. It is another object of the invention to provide by pickup device having a light control device of the type mentioned above arranged in a light path, thereby improving properties, image quality and reliability thereof.

The invention contemplates to provide a light control device comprising a liquid crystal optical element having a liquid crystal sealed inbetween substrates (e.g. a pair of glass substrates) provided by face-to-face relation with each other wherein the liquid crystal which is made of a guest-host liquid crystal which is made of a negative type liquid crystal as a host material, and a cell gap between the substrates is at least controlled to be in the range of 2 $\mu$m to 4 $\mu$m in an effective light path. The invention also contemplates to provide a pickup device having the light control device arranged in a light path of a pickup system.

The light control device and the pickup device of the invention make use of a guest-host type liquid crystal element arranged in a light path thereof wherein a negative type (wherein a dielectric anisotropy ($\Delta\in$ is negative) liquid crystal is used as a host material. Accordingly, the light transmittance under light transmitting conditions (especially, under transparent conditions) is significantly improved by the case using a positive type (i.e. a value of $\Delta\in$ is positive) liquid crystal. In addition, the cell gap is at least defined within a range of more than 2 $\mu$m to less than 4 $\mu$m at least in an effective light path, so that a response speed can be made greater while keeping a high ratio between the optical densities (contrast ratio) under light transmitting conditions (transparent conditions) and the light intercepting condition (light-shielding conditions).

The invention provides a liquid crystal optical element having an improved optical function for use as a light control device and relies on an invention of earlier Japanese Patent Application No. Hei 11-322186, assigned to the same assignee. According to this invention, a light control device is constituted of a liquid crystal element and a polarizer arranged in a light path incident on the liquid crystal element, and a guest-host type liquid crystal using a negative type liquid crystal as a host material. Eventually, a ratio between absorbances under no voltage applying conditions and voltage applying conditions (i.e. a ratio between optical densities) is improved by a great contrast ratio of the light control device. Thus, one enables to normally conduct light control operations in bright to dark places.

In the guest-host type liquid cell (GH cell) 2 shown in FIGS. 14A and 14B, a positive type liquid crystal where a dielectric anisotropy ($\Delta\varepsilon$ is positive is used as a host material, a positive type dye 4 which has dichromaticity and in which a light absorption anisotropy $\Delta A$ is positive, is used as a guest material 4, and the polarizer 1 is provided at an incident side of the GH cell 2. When a working voltage using a rectangular wave as a drive wave is applied to so as to measure a change of light transmittance, it has been found that, as shown in FIG. 15, as the working voltage increases, an average light transmittance of visible light in the air (wherein a transmittance through the liquid crystal cell along with the polarizer is taken as a reference (100%) herein and whenever it appears hereinafter) increases. Nevertheless, when the voltage increases up to 10V, a maximum transmittance arrives only at about 60%, with the gentle change of the light transmittance.

This is considered for the reason that where a positive type host material is used, liquid crystal molecules whose director does not change (or undergoes little change) in the direction, remain owing to the strong interaction of the liquid crystal molecules at the interface between the liquid crystal cell and the liquid crystal alignment film under conditions where no voltage is applied to.

In contrast, in the earlier invention, a guest-host type liquid crystal cell (GH cell) 12 is provided as shown in FIGS. 3A to 3C. In the cell 12, MLC-6608, made by Merck & Co., Inc., which is a liquid crystal of a negative type and whose dielectric anisotropy ($\Delta\varepsilon$) is negative, is used as a host material 13, for example, and D5 of BDH Co., Ltd., which is a positive type dye having dichromaticity, is used, for example, as a guest material 4. In this arrangement, a polarizer 11 is provided at an incident side of the GH cell 12 to measure a change in light transmittance when a working voltage is applied thereto. As a result, it has been found that, as shown in FIG. 4, when the working voltage increases, the average light transmittance (in the air) of visible light is reduced by about 75% up to several % of a maximum transmittance, with the change of the light transmittance being relatively sharp.

This is considered for the reason that where a negative type host material is used under which the interaction of liquid crystal molecules at the interface of the liquid crystal cell and the light crystal alignment film is very weak under conditions of applying no voltage, light is likely to transmit under conditions where no voltage is applied thereto and the direction of directors of the liquid crystal molecules is likely to undergo a change along with a voltage being applied to.

In the practice of this invention, the GH cell is constituted by use of a negative type host material in such a way as set out hereinabove, thereby improving a light transmittance (especially, under transparent conditions), thus enabling one to realize a compact light control device ensuring the use of the GH cell fixed into a position of a pickup optical system. In this case, when a polarizer is arranged in a light path of incident light on the liquid crystal element, a ratio between absorbances under no voltage-applying conditions and under voltage-applying conditions (i.e. a ratio between optical densities) is further improved, and the contrast ratio of the light control device becomes so great that light control operations can be normally performed in bright to dark places.

We have made intensive studies on a further improvement in characteristics of a light control device using such a cell as GH cell as described hereinabove. As a result, it has been found that as shown in FIG. 1, a ratio between optical densities under transparent and light-shielding conditions of a liquid crystal element is greatly influenced by a distance or gap between two glass substrates (i.e. a cell gap) constituting the GH cell.

More particularly, a greater cell gap, or a greater thickness of the liquid crystal layer, results in a greater difference in light transmittance between transparent and light-shielding conditions. Although a optical density ratio is taken great, the light transmittance under transparent conditions, which is one of the merits in the use of a negative type liquid crystal as a host material, becomes lower.

As is particularly shown in FIG. 2, it has also been found that the change of the cell gap results in a great change in response speed of the light control device using the GH cell, and that when the cell gap becomes great and the liquid crystal layer becomes thick, the response speed certainly becomes slower.

In view of these, it has been found that in case where a light control device using a guest-host type liquid crystal is made, there is a certain range of the cell gap, within which several characteristics that are difficult to stand together, e.g. a light transmittance under transparent conditions, a light transmittance under light-shielding conditions, and a response time of a liquid crystal element, can be satisfied or well-balanced.

More particularly, in order to realize a light control device which makes use of a liquid crystal element and is convenient for practical applications, it is necessary to keep a satisfactorily high optical density ratio without lowering a response speed, for which it has been found that the gap between the glass substrates of the GH cell (i.e. a cell gap), between which a liquid crystal is sealed, has to be set within a range of more than 2 $\mu$m up to less than 4 $\mu$m. The invention has been accomplished based on this finding.

In other words, when the cell gap is smaller than 2 $\mu$m, the response speed for use as a light control device becomes greater and the light transmittance under transparent conditions is improved, Nevertheless, the light transmittance under light-shielding conditions inconveniently increases as well. Eventually, a high optical density ratio (contrast ratio) cannot be attained. In contrast, when the cell gap exceeds 4 $\mu$m, a high optical density is ensured, but the light transmittance under transparent conditions gets lower and a response speed as a light control device is significantly degraded. Especially, when the device is so driven as to slightly change the light transmittance in a half-tone range, the response speed considerably becomes lower (Drive a in FIG. 2). In FIG. 2, where a voltage is so changed as to develop a halftone or is changed, for example from 2V to 3V as in Drive (a) in comparison with the cases of Drives (b), (c) and (d) wherein the drive is changed from transparent conditions to light-shielding conditions, e.g. from 0V to 5 V, the response speed becomes slower owing to the shortage of the voltage, with a tendency to suffer from a great influence given by the size of the cell gap.

In the practice of the invention, it is preferred, as shown in view of FIGS. 1 and 2, that the cell gap is in the range of 2 to 3.5 μm, and more preferably from 2 to about 3 μm.

It is also preferred that the gap at the intermediate portion of the liquid crystal cell corresponding to the effective light path is smaller than those in the vicinity of the intermediate portion. More particularly, while controlling the gap, for example, between opposing glass substrates of the GH cell constituting a liquid crystal optical element at 2 to 4 μm, a gap length at the cell intermediate portion (or at the center of the cell) is made smaller than a gap length around the peripheral portion of the cell.

According to extensive studies made by us, it has been found that the dependence of a response speed (especially, a response speed under half-tone driving conditions) on the cell gap tends to be greater than that of an optical density ratio. In accordance with the invention, while keeping an optical density ratio necessary for a light control device, the liquid crystal element in the effective light path can be able to work at a higher speed.

For the formation of such a cell gas as defined hereinabove, a spacer is provided between a transparent electrode and a facing transparent substrate formed by an alignment film, and the liquid crystal cell is sealed with a sealing material along the periphery thereof. It is preferred that the sealing material is formed in a diameter larger than the spacer, or the sealing material contains a hard material in the form of balls or fibers.

It will be noted that in the light control device and pickup device of the invention, the negative type liquid crystal in the liquid crystal optical element is negative with respect to the dielectric anisotropy, and the guest material may be made of a positive or negative type dichromatic dye.

In the practice of the invention, usable negative type host materials whose dielectric anisotropy ($\Delta\epsilon$) is negative, include those indicated below. It is to be noted that in practical applications, a composition obtained by blending compounds selected from those compounds indicated below may be used so as to show nematic properties within a practically employed temperature range.

Exemplified Compounds

| Molecular Structure | $\Delta\epsilon$ | C | N | I |
|---|---|---|---|---|
| $C_5H_{11}$—⬡—⬡—COO—⬡—$C_7H_{15}$, with CN substituent | −4.0 | +45 | +101 | + |
| $C_3H_7$—⬡—⬡—COO—⬡—$C_4H_9$, with CN substituent | −4.2 | +56 | +113 | + |
| $C_4H_9$—⬡—COO—⬡—O—$C_4H_9$, with CN, CN substituents | −22 | +85.8 | SA(+52.0) | + |
| $C_5H_{11}$—⬡—⬡—COO—⬡—O—$C_5H_{11}$, with CN, CN substituents | −18 | +133.5 | +143.5 | + |
| $C_5H_{11}$—⬡—⬡—$C_5H_{11}$, with CN substituent | −8 | +24 | 66 | + |

Other Fundamental Skeletons

In the following formulas, E, R1, R2 and L, respectively, represent a linear or branched alkyl group, alkoxy group, alkenyl group, fluoroalkoxy group or fluoroalkenyl group, —CN or the like.

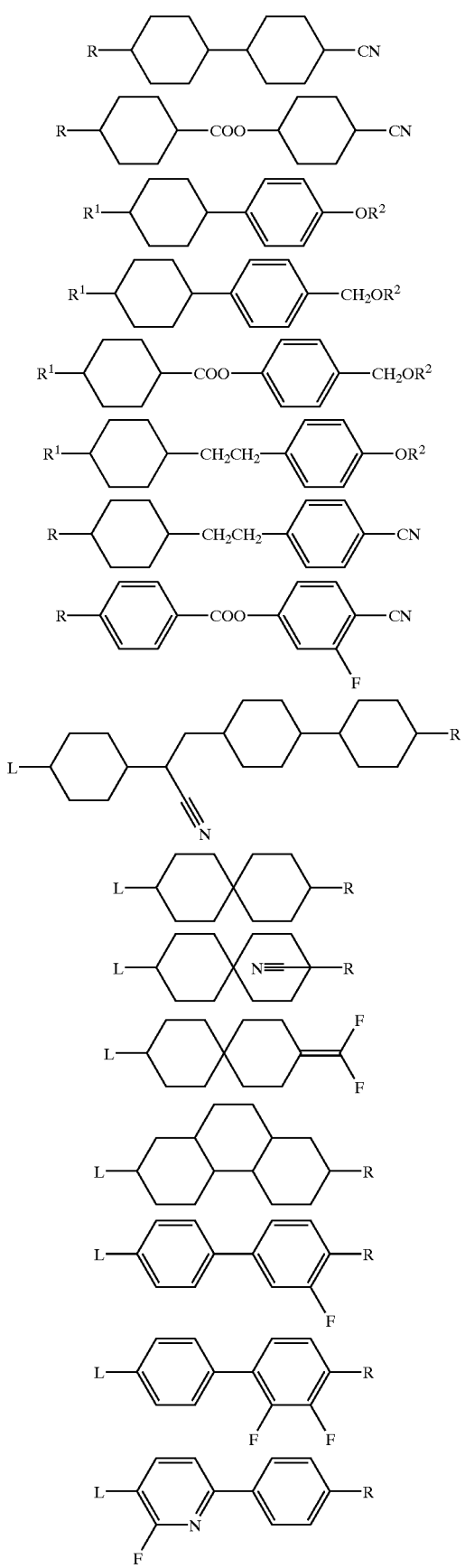
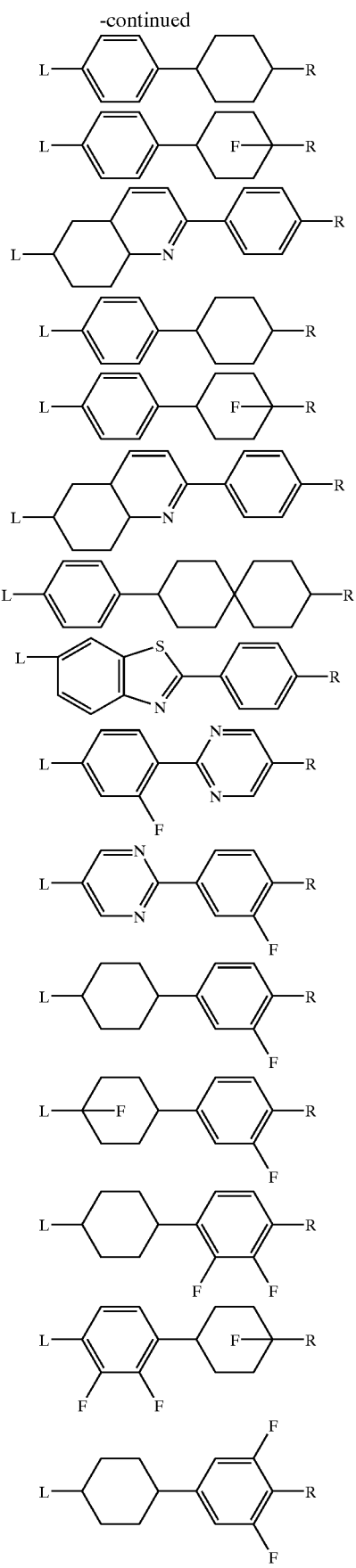

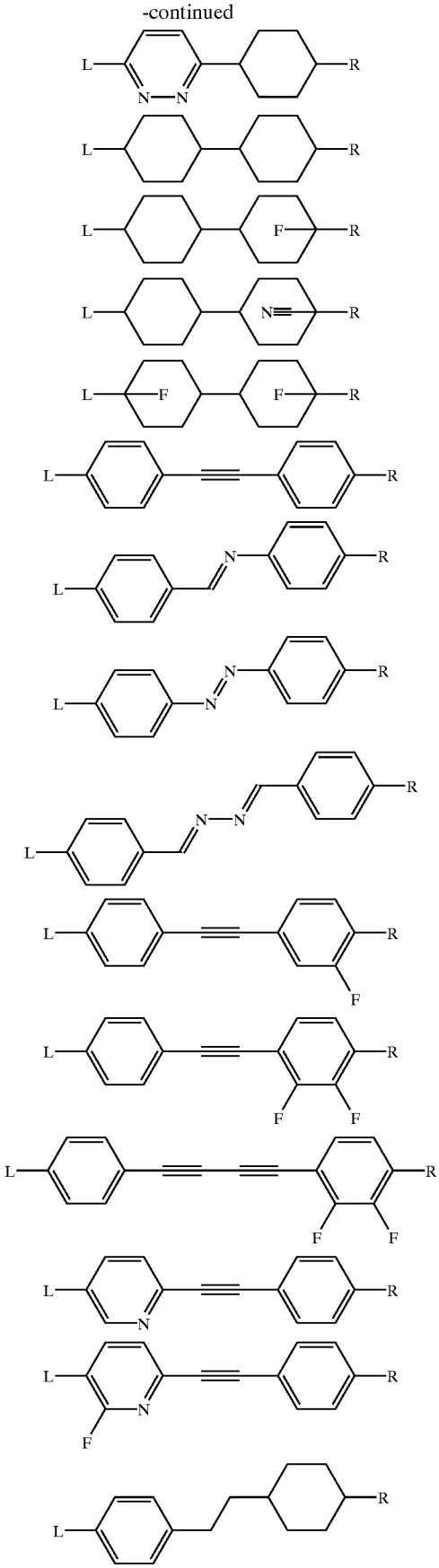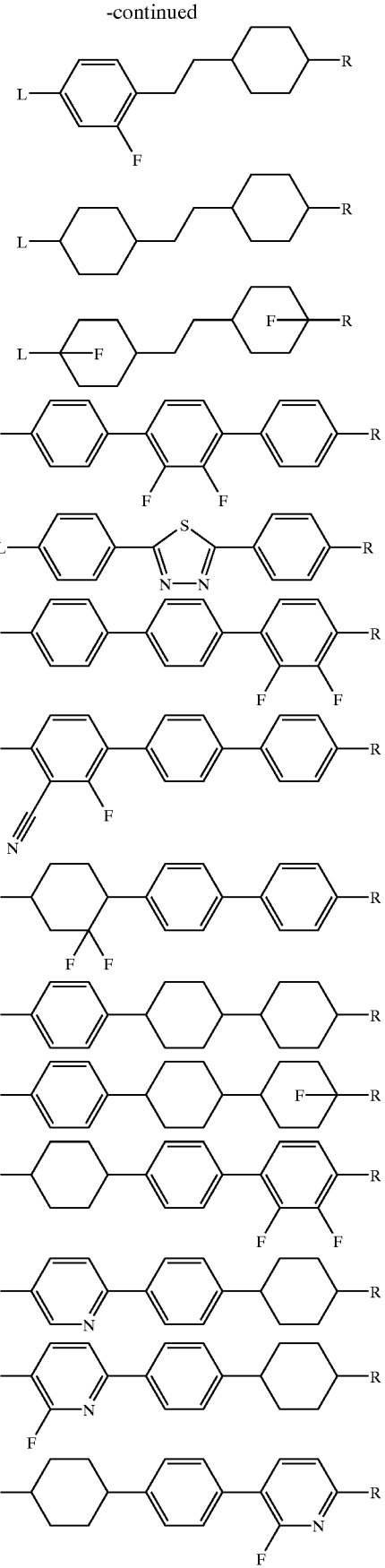

-continued

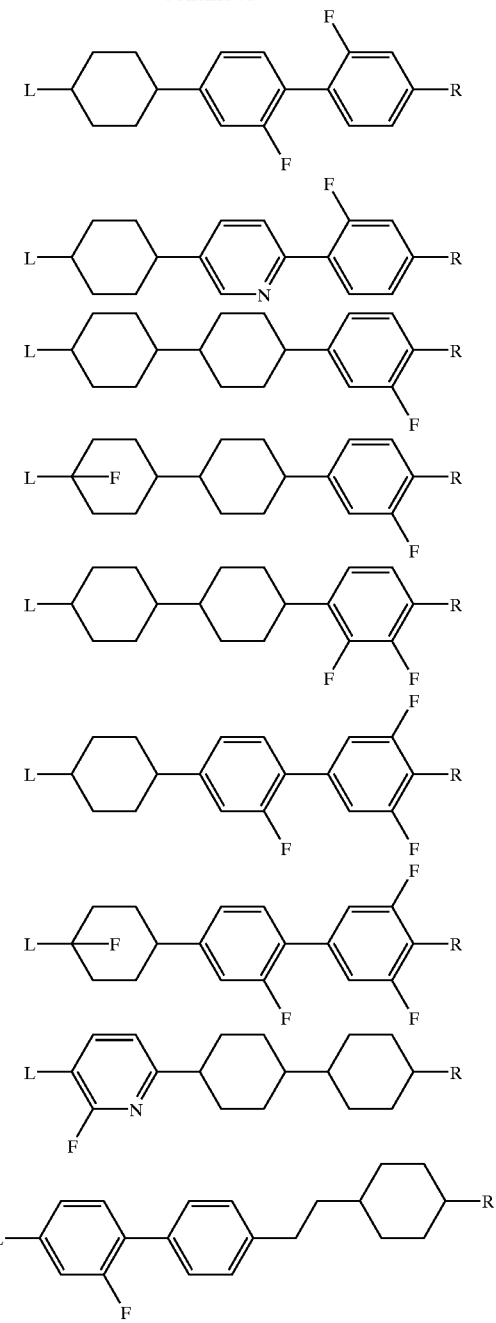

These compounds may be commercially available under the designations indicated below, with physical properties thereof shown below.

MLC-6608 (Made by Merck & Co., Inc.)

| | | | |
|---|---|---|---|
| S—N transition temperature: | <−30.0° C. | | |
| Clarification temperature: | +90.0° C. | | |
| Rotational viscosity: $v_1$ | 20° C. | 186.0 | mPa · s |
| Optical anisotropy | $\Delta n$ | 0.0830 | |
| +20° C., 589.3 nm | $n_e$ | 1.5586 | |
| | $n_o$ | 1.4756 | |

-continued

| | | | |
|---|---|---|---|
| Dielectric anisotropy | $\Delta\epsilon$ | −4.2 | |
| +20° C., 1.0 kHz | $\epsilon_\perp$ | 7.8 | |
| | $\epsilon_{\shortparallel}$ | 3.6 | |
| Elastic constant | $K_{11}$ | 16.7 | pN |
| +20° C. | $K_{33}$ | 18.1 | pN |
| | $K_{33}/K_{11}$ | 1.08 | |
| Low temperature stability | −30° C. | 1000 | h cr |

MLC-2039 (Made by Merck & Co., Inc.)

| | | | |
|---|---|---|---|
| Clarification temperature: | +91.0° C. | | |
| Rotational viscosity: | 20° C. | 163.0 | mPa · s |
| Optical anisotropy | $\Delta n$ | 0.0821 | |
| +20° C., 589.3 nm | $n_e$ | 1.5575 | |
| | $n_o$ | 1.4754 | |
| Dielectric anisotropy | $\Delta\epsilon$ | −4.1 | |
| +20° C., 1.0 kHz | $\epsilon_\perp$ | 7.6 | |
| | $\epsilon_{\shortparallel}$ | 3.5 | |

MLC-2038 (Made by Merck & Co., Inc.)

| | | | |
|---|---|---|---|
| Clarification temperature: | +80.0° C. | | |
| Flow viscosity: $v$ | 20° C. | 29 | mm²s⁻¹ |
| | 0° C. | 128 | mm²s⁻¹ |
| | −20° C. | 1152 | mm²s⁻¹ |
| | −30° C. | 6369 | mm²s⁻¹ |
| Rotational viscosity: $v_1$ | 20° C. | 179.0 | mPa · s |
| Optical anisotropy | $\Delta n$ | 0.1032 | |
| +20° C., 589.3 nm | $n_e$ | 1.5848 | |
| | $n_o$ | 1.4816 | |
| Dielectric anisotropy | $\Delta\epsilon$ | −5.0 | |
| +20° C., 1.0 kHz | $\epsilon_\perp$ | 9.0 | |
| | $\epsilon_{\shortparallel}$ | 4.0 | |
| Elastic constant | $K_{11}$ | 13.8 | pN |
| +20° C. | $K_{33}$ | 18.1 | pN |
| | $K_{33}/K_{11}$ | 1.31 | |
| Low temperature stability | −30° C. | 48 | h cr |
| | −20° C. | 432 | h cr |

MLC-2037 (Made by Merck & Co., Inc.)

| | | | |
|---|---|---|---|
| S—N transition temperature: | <−20.0° C. | | |
| Clarification temperature: | +71.0° C. | | |
| Rotational viscosity: $v_1$ | 20° C. | 132.0 | mPa · s |
| Optical anisotropy | $\Delta n$ | 0.0649 | |
| +20° C., 589.3 nm | $n_e$ | 1.5371 | |
| | $n_o$ | 1.4722 | |
| Dielectric anisotropy | $\Delta\epsilon$ | −3.1 | |
| +20° C., 1.0 kHz | $\epsilon_\perp$ | 6.7 | |
| | $\epsilon_{\shortparallel}$ | 3.6 | |
| Low temperature stability | −20° C. | 1000 | h cr |

The dichromatic dye molecules usable in the light control device based on the invention are those indicated below.

| | Molecular structure |
|---|---|
| D5 | 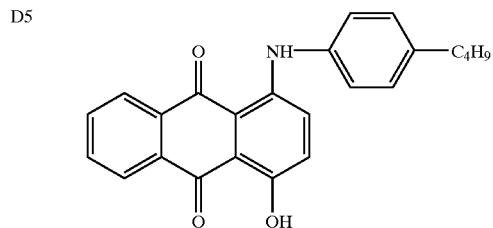 |
| D35 | 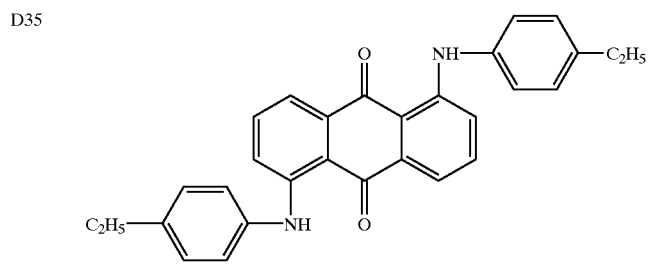 |
| L-dye B | 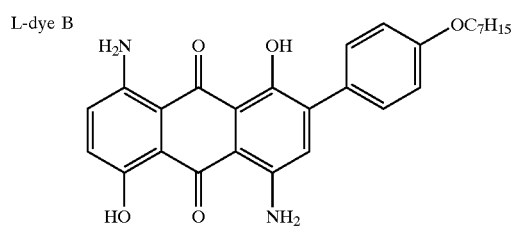 |
| G209 | 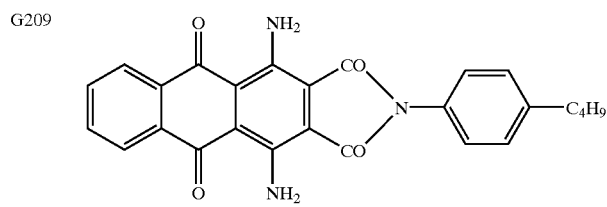 |
| G168 | 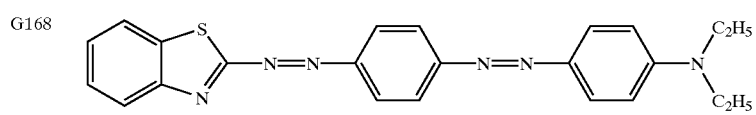 |
| G165 | 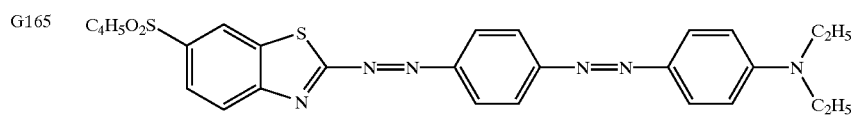 |
| G224 | 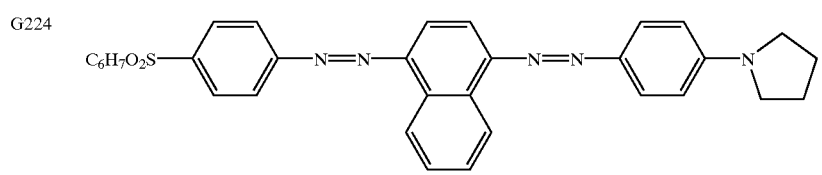 |
| G205 | 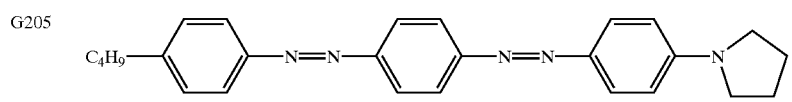 |

-continued

G232 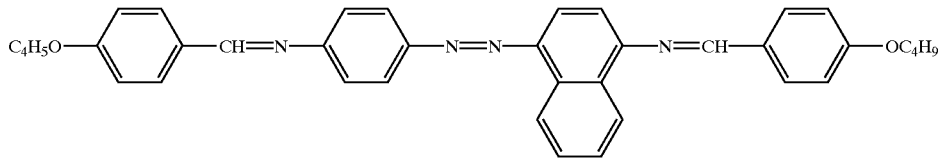

|  | λm (nm) | Nominal Color | Dichromatic Ratio |
|---|---|---|---|
| D5 | 590 | Blue | 5.3 |
| D35 | 553 | Purple | 6.5 |
| L-dye B | 641 | Blue | 9.2 |
| G209 | 687 | Blue | 9.5 |
| G168 | 574 | Blue | 10.6 |
| G165 | 595 | Blue | 10.3 |
| G224 | 574 | Bluish purple | 9.7 |
| G205 | 507 | Red | 11.4 |
| G232 | 450 | Yellow | 12.1 |

D5, D35: made by BDH, L-dye B: made by Rosch
Others: made by Nippon Photosensitive Dye Research Inst.

| Dye Structure | λmax (nm) (in liquid crystal) | S (value at λmax) |
|---|---|---|
| $H_9C_4O$—⌬—CH=N—⌬—N=N—[naphthalene]—N=CH—⌬—$OC_4H_9$ | 450 | 0.79 |
| $H_9C_4$—⌬—N=N—[naphthalene]—N=N—⌬—$OCH_3$—⌬—$OC_5H_{11}$ | 440 | 0.78 |
| $H_9C_4$—⌬—N=N—[naphthalene]—N=N—⌬—N(pyrrolidine) | 542 | 0.75 |
| $H_{17}C_8$—⌬—OCO—⌬—N=N—[naphthalene]—N=N—⌬—N($CH_3$)($CH_3$) | 548 | 0.78 |
| $H_9C_4$—⌬—N=N—⌬—N=N—[naphthalene]—N=N—⌬—N($C_2H_5$)($C_2H_5$) | 573 | 0.77 |

-continued

| Dye Structure | λmax (nm) (in liquid crystal) | S (value at λmax) |
|---|---|---|
| (naphthalene bis-azo dye with H9C4-C6H4-CH2NH- and -NHCH2-C6H4-C4H9 substituents) | 610 | 0.83 |
| 1-(phenylthio)-5-(4-tert-butylphenylthio)anthraquinone | 464 | 0.80 |
| 1,5-bis(4-tert-butylphenylthio)-8-(4-tert-butylphenylthio)anthraquinone | 520 | 0.77 |
| 1,5-diamino-4,8-dihydroxy-2-(4-octyloxyphenyl)anthraquinone | — | 0.76 |
| 1,4,5,8-tetraamino-2,7-bis(4-methylphenoxy)anthraquinone | 638 | 0.78 |
| 1,4-diamino-2-(4-butylcyclohexyloxycarbonyl)anthraquinone | 638 | 0.77 |

-continued

| Dye Structure | λmax (nm) (in liquid crystal) | S (value at λmax) |
|---|---|---|
| 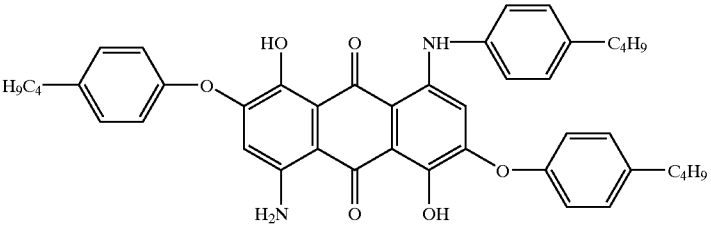 | 627 | 0.76 |
| 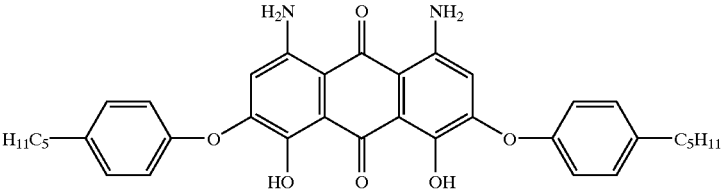 | 640 | 0.77 |
| 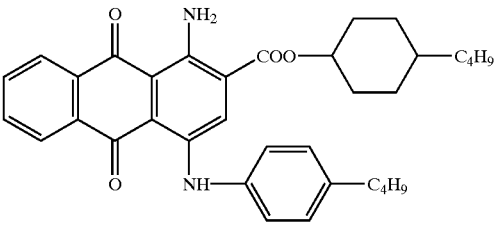 | 668 | 0.74 |
| 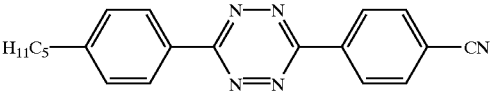 | 565 | −0.377 |
| 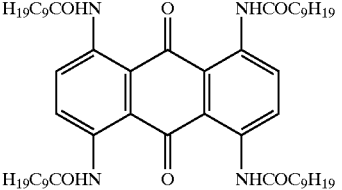 | 548 | −0.33 |

As shown, for example, in FIG. 7, a light control device 23 consisting of such a cell as GH cell 12 as set out hereinbefore is arranged between front group lenses 15 and rear group lenses 16, each constituted of a plurality of lenses like such as zoom lens. The light transmitted through the front group lenses 15 is linearly polarized via a polarizer 11 and enters into the GH cell 12. The light transmitted through the GH cell 12 is converged by means of the rear group lenses 16 and projected as a picture on an imaging surface 17.

The polarizer 11 of the light control device 23 is so designed as to be taken in or out relative to the effective light path of incident light on the GH cell 11, like in the case of the afore-mentioned earlier application, assigned to the same applicant. More particularly, when moved to the position indicated by an imaginary line, the polarizer can be taken out from the effective light path. By means of taking the polarizer 11 in and out, there may be used such a mechanical iris as is particularly shown in FIG. 8.

This mechanical iris is a mechanical iris device which is usually employed for digital still cameras and video cameras, and is composed mainly of two iris blades 18, 19, and a polarizer 11 attached to the iris blade 18. The iris blades 18, 19 can be vertically moved, respectively. The iris blades 18, 19 are relatively moved in the directions indicated by arrows 21 by use of a drive motor not shown.

In this way, as shown in FIG. 8, the iris blades 18, 19 are partially superposed. When the degree of the superposition becomes great, an opening 22 above the effective light path located in the vicinity of the center of the iris blades 18, 19 is covered with the polarizer 11.

FIGS. 9A to 9C are, respectively, an enlarged view of part of the mechanical iris in the neighborhood of the effective light path 20. Simultaneously with the downward movement of the iris blade 18, the iris blade 19 moves upwardly. This results in, as shown in FIG. 9A, the movement of polarizer 11 attached to the iris blade 18 outside the effective light path 20. In contrast, when the iris blade 18 is moved upwardly or the iris blade 19 is moved downwardly, the iris blades 18, 19 are superposed with each other. Accordingly, the polarizer 11 moves on the effective light path as shown in FIG. 9B so that the opening 22 is gradually covered. When the degree of the mutual superposition of the iris blades 18, 19 becomes great, the polarizer 11 fully covers the opening 20 therewith as is particularly shown in FIG. 9C.

Next, the light control operation of the light control device 23 using the mechanical iris is illustrated.

As a subject, not shown, comes brighter, the iris blades 18, 19 that are made open in vertical directions as shown in FIG. 9A are driven with a motor not shown, and start to be superposed. This permits the polarizer 11 attached to the iris blade 18 to gradually enter into the effective light path 20, thereby covering part of the opening 22 therewith (see FIG. 9B).

At this stage, the GH cell 12 is in a state where no light is absorbed (although a slight degree of absorption with the GH cell 12 takes place such as by thermal fluctuation or surface reflection). Hence, the light passed through the polarizer 11 and the light passed through the opening 22 becomes substantially equal to each other with respect to the intensity distribution.

Thereafter, the polarizer 11 is in the state of fully covering the opening 22 (see FIG. 9C). Further, if the subject increases in brightness, a voltage to the GH cell 12 is increased so that light is absorbed in the GH cell to control the light intensity.

In contrast, where the subject becomes dark, a voltage applied to the GH cell 12 is reduced or no voltage is applied, thereby causing the absorption of light with the GH cell not to take place. When the subject becomes further darker, a motor, not shown, is driven to move the iris blade 18 downwardly or the iris blade 18 upwardly. In this manner, the polarizer 11 is moved outside the effective light path 20 (see FIG. 9A).

As is shown in FIGS. 7, 8 and 9A to 9C, since the polarizer (having a transmittance, for example, of 40% to 50%) is moved outside the effective light path 20, so that the light is not absorbed with the polarizer. Accordingly, the maximum transmittance of the light control device can be increased, for example, to a level two times or much higher. More particularly, this light control device has a maximum transmittance, for example, of about two times that of a conventional light control device including fixedly set polarizer and GH cell. It will be noted that minimum transmittances of both types of devices are equal to each other.

The polarizer 11 is taken out or in by use of the mechanical iris that has been put into practice in the field of digital still cameras and the like, and thus, the light control device can be readily realized. Since the GH cell 12 is used, the GH cell is able to absorb light in addition to the light control with the polarizer, thus contributing to the control of light.

In this way, the light control device of the invention ensures a high contrast ratio between brightness and darkness and can also keep substantially a uniform distribution of light quantity.

BRIEF DESCRIPTION OF THE DRAWINGS

FIG. 1 is a graph showing the relation between the light transmittance of a light control device (or a liquid crystal optical element) and the liquid crystal cell gap according to the invention;

FIG. 4 is a graph showing the relation between the light transmittance and the drive voltage of the light control device according to the invention;

FIGS. 14A and 14B are, respectively, a schematic view showing the working principle of a conventional light control device; and FIG. 15 is a graph showing the relationship between the light transmittance and the drive voltage of the conventional light control device.

PREFERRED EMBODIMENTS OF THE INVENTION

EXAMPLE 1

An example of a light control device using a guest-host type liquid crystal (GH) cell is now described.

Figures 3A, 3B:
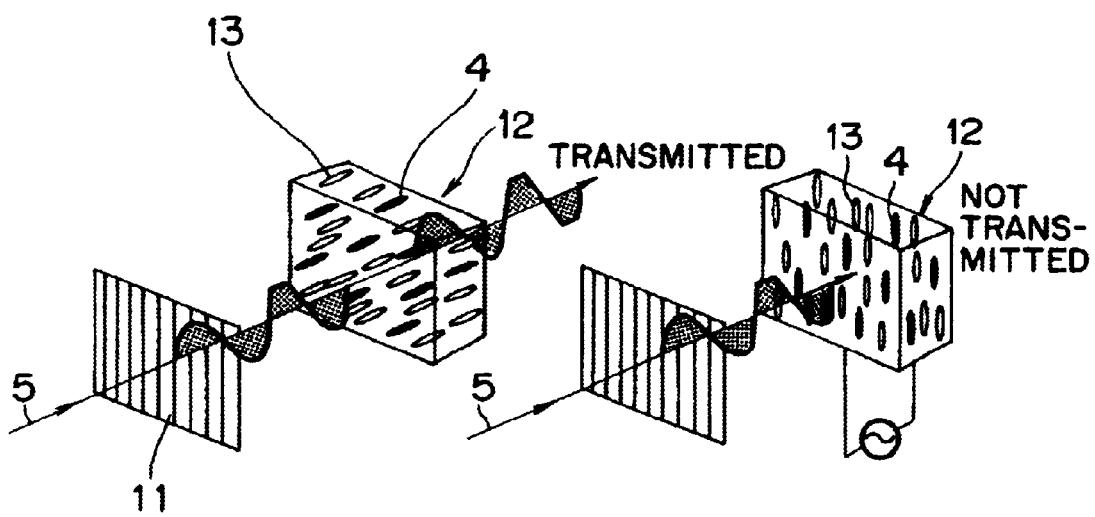
FIGS. 3A and 3B are, a schematic views showing a working principle of the light control device according to the invention.
Figure 3C:
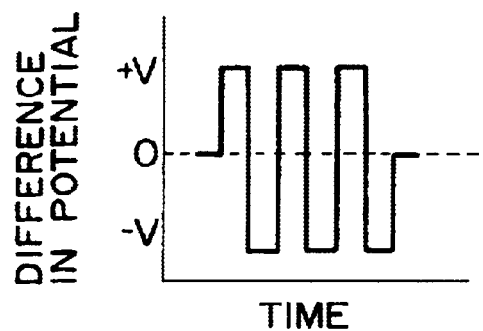
FIG. 3C is a graph showing the relationship between a potential of the waveform of an applied voltage and elapsed time.

As is shown in FIGS. 3A to 3C, the light control device of the invention is composed of a GH cell 12 and a polarizer 11. As is particularly shown in schematic front view and sectional view in FIGS. 5A and 5B and is also shown in more detail in FIG. 6A, the GH cell 12 includes two glass substrates 31A, 31B, on which transparent electrodes 32A, 32B and alignment films 33A, 33B are, respectively, formed, and a mixture 34 which is made of negative type liquid crystal molecules (host material) 13 and positive type dichromatic dye molecules (guest material) 4 and is sealed between the two glass substrates.

For the liquid crystal molecules 13, there was used, for example, MLC-6608, made by Merck Co., & Inc., which is a negative type liquid crystal whose dielectric anisotropy is negative, and for the dichromatic dye molecules 4, there was used D5, made by BDH, which is a positive type dye having anisotropy with respect to the absorption of light and absorbing light along the direction of a major axis of the molecules. The light absorption axis of the polarizer 11 was intersected at right angles with respect to the light absorption axis at the time when a voltage is applied to the GH cell 12.

Figure 7:
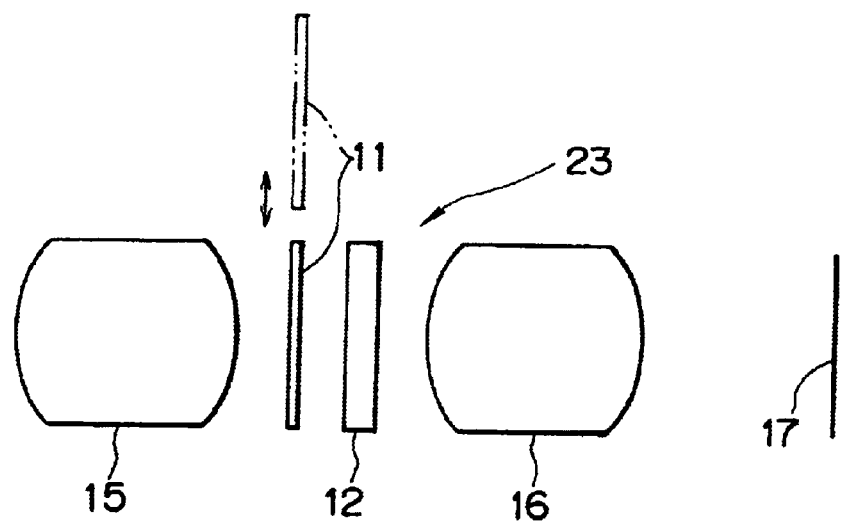
FIG. 7 is a schematic side view showing the light control device according to the invention.

As shown, for example, in FIG. 7, the light control device 23 constituted of the GH cell 12 was arranged between front group lenses 15 and rear group lenses, each constituted of a plurality of lenses as in a zoom lens system. The light transmitted through the front group lenses was linearly polarized via the polarizer 11 and passed into the GH cell. The light transmitted through the GH cell 12 was converged with the rear group lenses and projected as a picture on an imaging surface 17.

Figure 8:
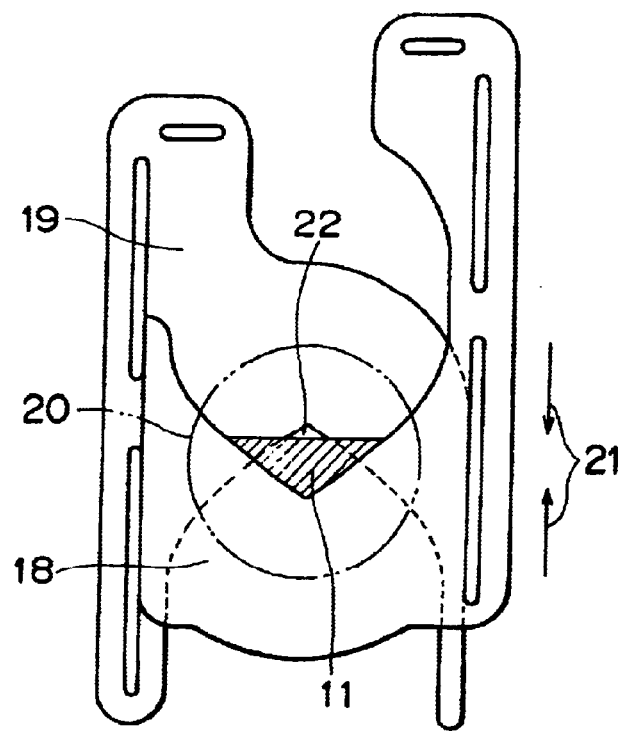
FIG. 8 is a schematic front view showing a mechanical iris of the light control device of the invention.
Figure 9A:
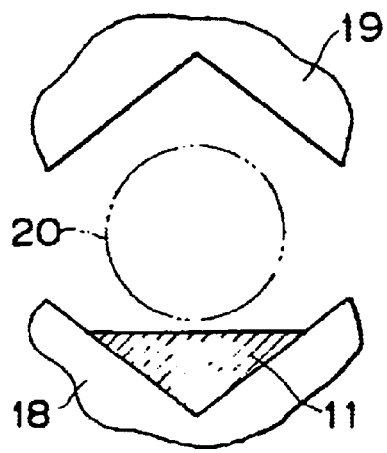
FIGS. 9A, 9B and 9C are, respectively, a schematic, enlarged view of part of the mechanical iris showing the operations of the iris in the vicinity of an effective light path of the light control device according to the invention.
Figure 9B:
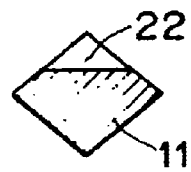
Figure 9C:
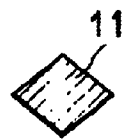

The polarizer 11 constituting the light control device 23 can be taken out or in relative to the effective path of light incident on the GH cell 12, like the case of the invention of the earlier application, assigned to the same applicant. More particularly, when the polarizer 11 is moved to a position indicated by the imaginary line, the GH cell 12 can be taken out from the effective light pass. For a means of taking the polarizer out or in, such a mechanical iris of the type shown in FIG. 8 may be used.

The method of making the GH cell 12 is now described. The glass substrates 31A, 31B, which are, respectively, formed with the transparent electrode patterns 32A, 32B and the alignment films 33A, 33B, are applied at marginal or peripheral portions thereof with a sealing material 35, which is made, for example, of a thermosetting epoxy resin containing glass fibers with a diameter of 4 $\mu$m, at a given width under the action of compressed air (see FIG. 10). Thereafter, the two glass substrates 31A, 31B are registered and superposed so that the applied surfaces are facing each other, followed by heat treatment while compressing under appropriate conditions (e.g. 150 to 170° C. and 1 to 2 kg/cm$^2$) by means of a hot press to cure the sealing material along the marginal portions, thereby completing a liquid crystal cell (see FIG. 6A). It will be noted that in FIG. 10, the peripheral portions of the glass substrates 31A, 31B are depicted outside the sealing material 35 (and in FIGS. 5A and 5B and 6A to 6C, these are simply depicted substantially at the same position).

Figure 5A:
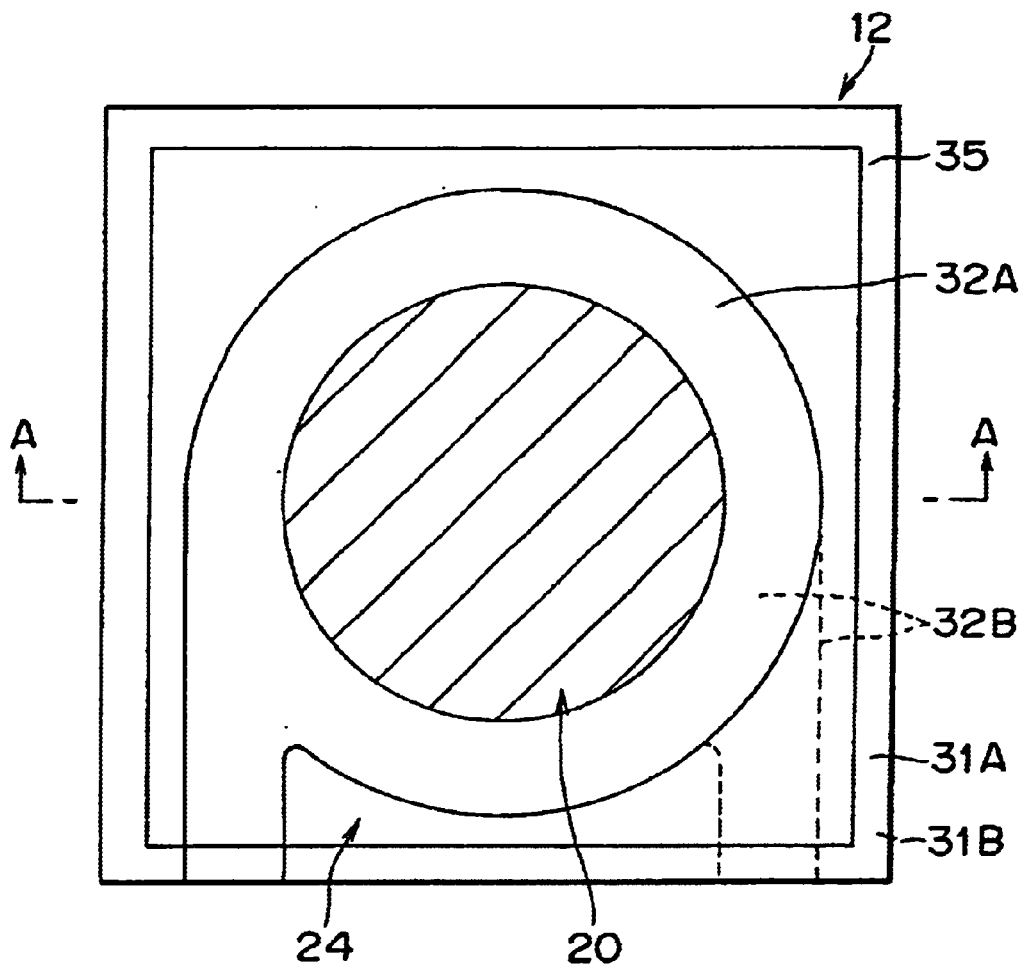
FIGS. 5A and 5B are, respectively, a schematic plan view and a schematic sectional view, taken along the line A—A of FIG. 5A, of a liquid crystal optical element of the control device of the invention.
Figure 5B:
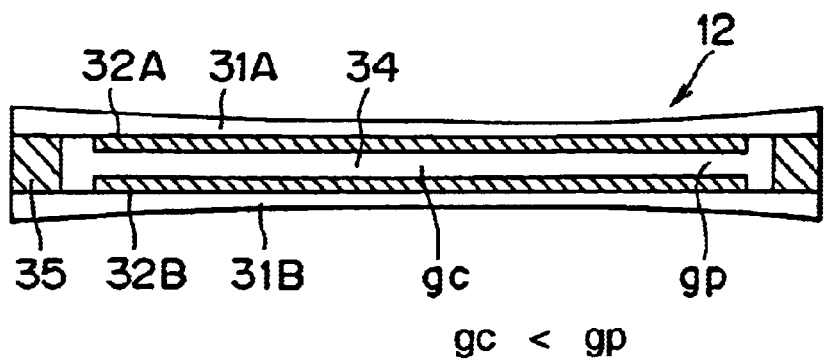
Figure 6A:
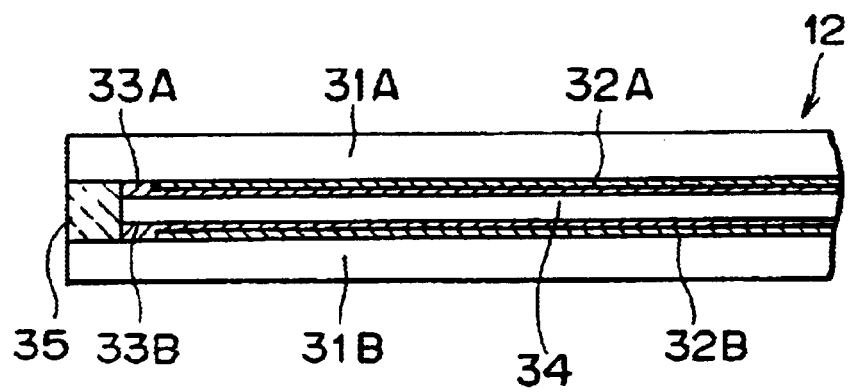
FIGS. 6A, 6B and 6C are, respectively, schematic sectional views of cells of liquid crystal optical elements according to different embodiments of the invention.
Figure 6B:
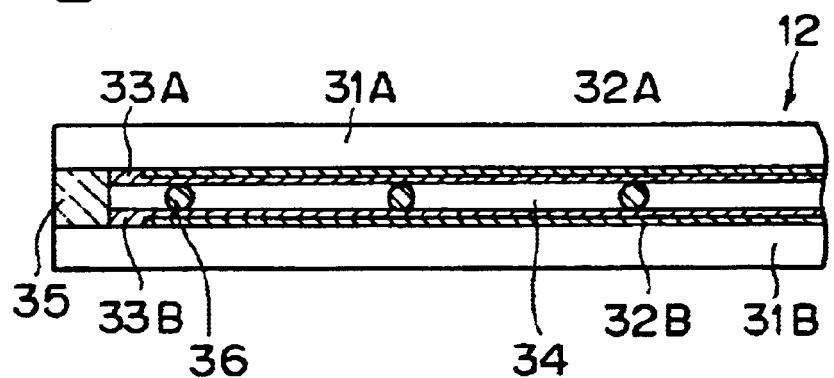

The measurement of a cell gap of the thus obtained liquid crystal cell 12 by means of a measuring instrument using the interference of light revealed that as is shown exaggeratively in FIGS. 5A and 5B, the cell 12 was finished to have a cell gap gc of about 3.1 $\mu$m at a central portion 20 thereof (effective light path) and a cell gap gp of about 3.8 $\mu$m at a peripheral portion 24 thereof.

A liquid crystal material 34 is sealed in the cell to provide the GH cell 12. A rectangular wave was inputted in the cell as a drive waveform to measure a change in light transmittance under conditions of applying a working voltage (see FIGS. 3A to 3C), revealing that as shown in FIG. 4, as the working voltage was applied to, an average transmittance of visible light (in air) was reduced by about 75% up to several % with respect to the maximum transmittance. Although depending on the structure of the liquid crystal cell used and the types of materials used, the GH cell 12 arrived substantially at a minimum transmittance by application of a pulse voltage of bigger than ±5V (1 kHz).

Figure 2:
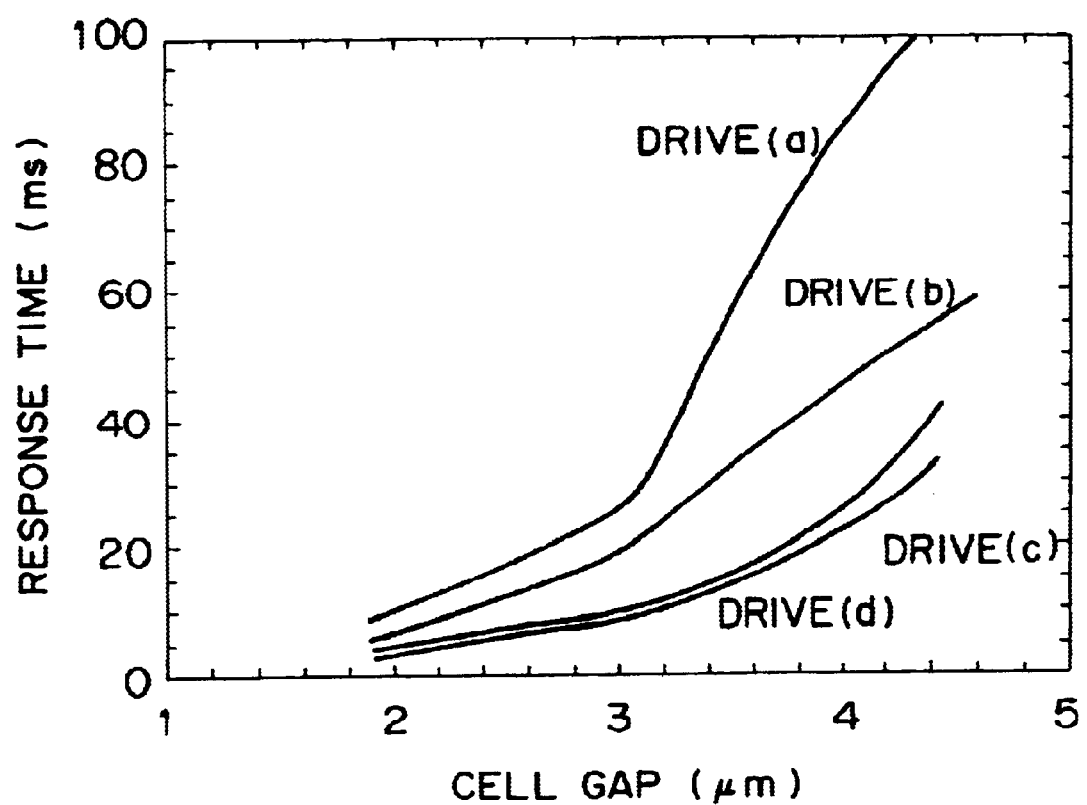
FIG. 2 is a graph showing the relation between the response time and the liquid crystal cell gap of the light control device.

Moreover, as show in FIG. 2, the response time of the light transmittance under conditions of changing a drive pulse voltage could be at 50 ms or below, thus ensuring high-speed operations.

In this example, the glass fibers in the sealing material 35 were selected to have an appropriate size and the hot pressing with a hot pressing plate for bonding the superposed glass substrates was conducted under appropriate conditions, with the result that the cell gap of the liquid crystal cell could be finished within a range of about 3.1 $\mu$m (at a central portion) to about 3.8 $\mu$m (at a peripheral portion).

Eventually, while ensuring a satisfactory difference between light transmittances under transparent and light-shielding conditions of the liquid crystal cell (i.e. an optical density ratio), the light control device could be operated at a high response speed.

A liquid crystal cell having a cell gap smaller than 2 $\mu$m made by using different cell-making conditions, revealing that although a higher response speed was obtained, the light transmittance increased as a while, and especially, the light transmittance increased to a greater extent under light shielding conditions, so that a satisfactory optical density ratio necessary for a light control device could not be obtained.

A liquid crystal cell whose cell gap exceeded 4 $\mu$m which was made under different cell-making conditions, revealing that although a greater optical density ratio between transparent and light-shielding conditions could be obtained, the response speed (especially, a response speed in halftone drive) is degraded, thereby disenabling one to satisfy the requirements for a light control device.

As a result of extensive studies, it was found essential to define a cell gap within 2 to 4 $\mu$m in order to realize a light control device that was made of a guest-host type liquid crystal cell using a negative type liquid crystal and a dichromatic dye.

EXAMPLE 2

In this example, plastic balls were arranged between the glass substrates as a spacer in the fabrication of a liquid crystal cell.

Figure 10:
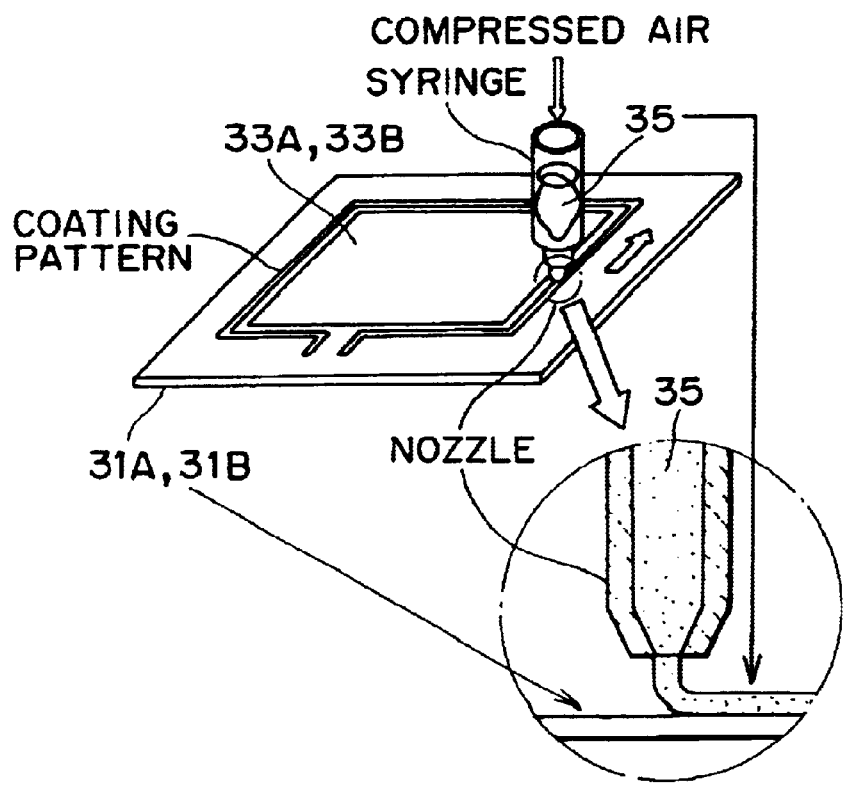
FIG. 10 is a schematic view illustrating the step of coating a sealing material in the fabrication of a cell according to the invention.

For the fabrication of a GH cell 12, a sealing material 35 made of a thermosetting epoxy resin containing, for example, glass fibers having a diameter of 3.5 $\mu$m was coated in a given width on a peripheral or marginal portion of one of glass substrates 31A, 31B, on which transparent electrode patterns 32A, 32B and alignment films 33A, 33B were formed, respectively, (see FIG. 10). Plastic balls having a diameter of 3 $\mu$m were, for example, sprayed uniformly over the other substrate. The two glass substrates were registered and superposed, followed by heat treatment while pressing by means of a hot press plate under appropriate conditions to cure the sealing material 35 along the peripheral portion thereby completing a liquid crystal cell (see FIG. 6B).

Figure 11B:
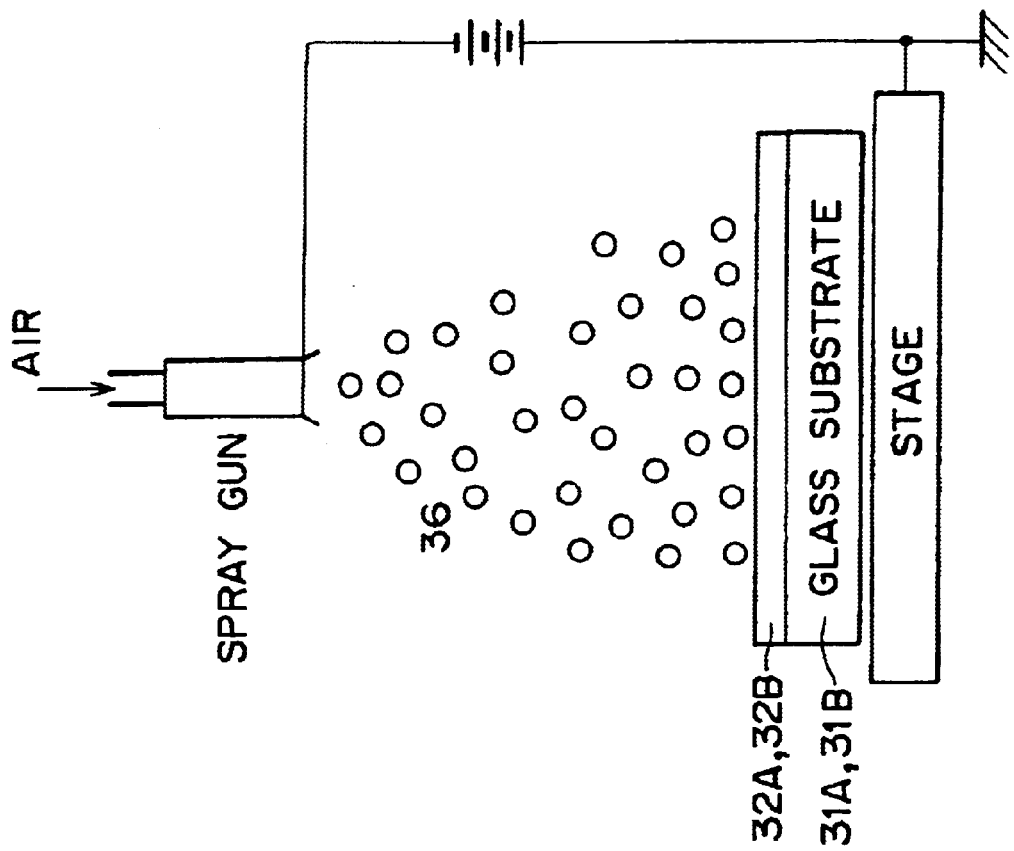
FIGS. 11A and B are schematic view illustrating the step of spraying a spacer in the fabrication of the cell according to the invention.
Figure 11A:
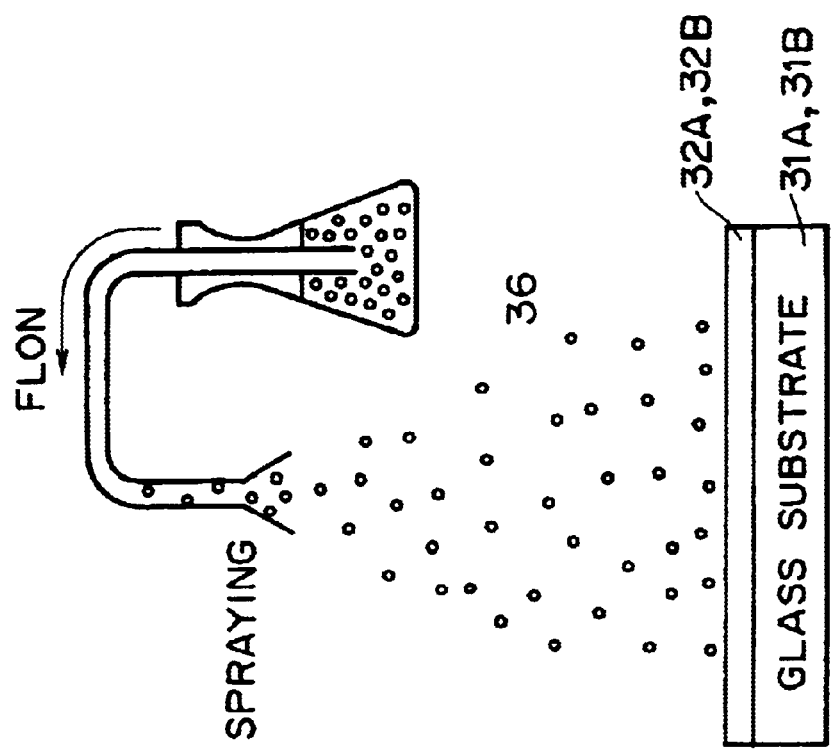

The plastic balls 36 were sprayed from above by use of a conventional technique, as is particularly shown in FIG. 11 and were substantially uniformly arranged over the entire surface of the glass substrate at a density of about 100 to 300 balls/mm2.

The cell gap of the results liquid crystal cell was measured by means of a measuring instrument using the interference of light, revealing that the cell gap at the center of the cell was finished at about 2.8 μm and at about 3.3 μm at the peripheral portion of the cell. The provision of the spacer made of the plastic balls 36 allowed the variation of the cell gap to be reduced over the case of Example 1.

A liquid crystal material 34 made of the molecules of a negative type liquid crystal (host material) and the molecules of a dichromatic dye (guest material) was sealed in the cell to provide a GH cell 12. The GH cell 12 was inputted with a rectangular wave as a drive waveform to measure a change in light transmittance under application of a working voltage (FIGS. 3A to 3C), revealing that like Example 1, as shown in FIG. 4, as the working voltage was applied to, the average transmittance of visible light (in the air) was reduced by about 75% up to several % with respect to the maximum transmittance.

The response time of the light transmittance under conditions where a drive pulse voltage was changed to 30 ms or below, ensured a higher-speed operation than in Example 1.

Figure 6C:
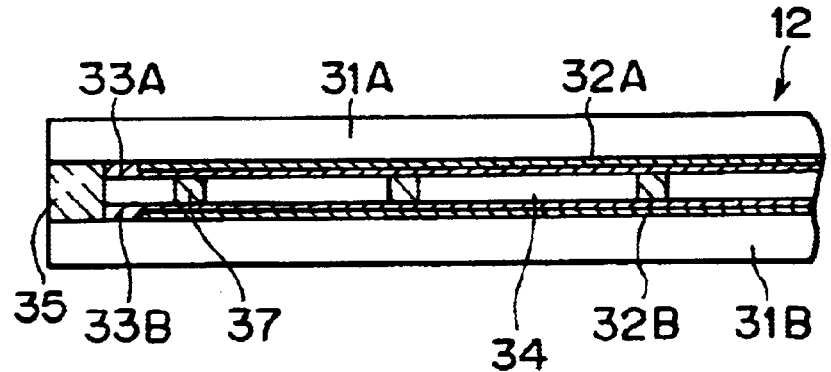

It will be noted that this example deals with a method of forming a spacer by an instance where it is sprayed from above, and a screen printing method may be used to from the spacer in order to ensure more uniform formation. The spacer is not limited to a spherical one with respect to the shape thereof, and a columnar spacer 37 may be provided in such a way as by printing or lithography as is shown in FIG. 6C.

EXAMPLE 3

Figure 12:
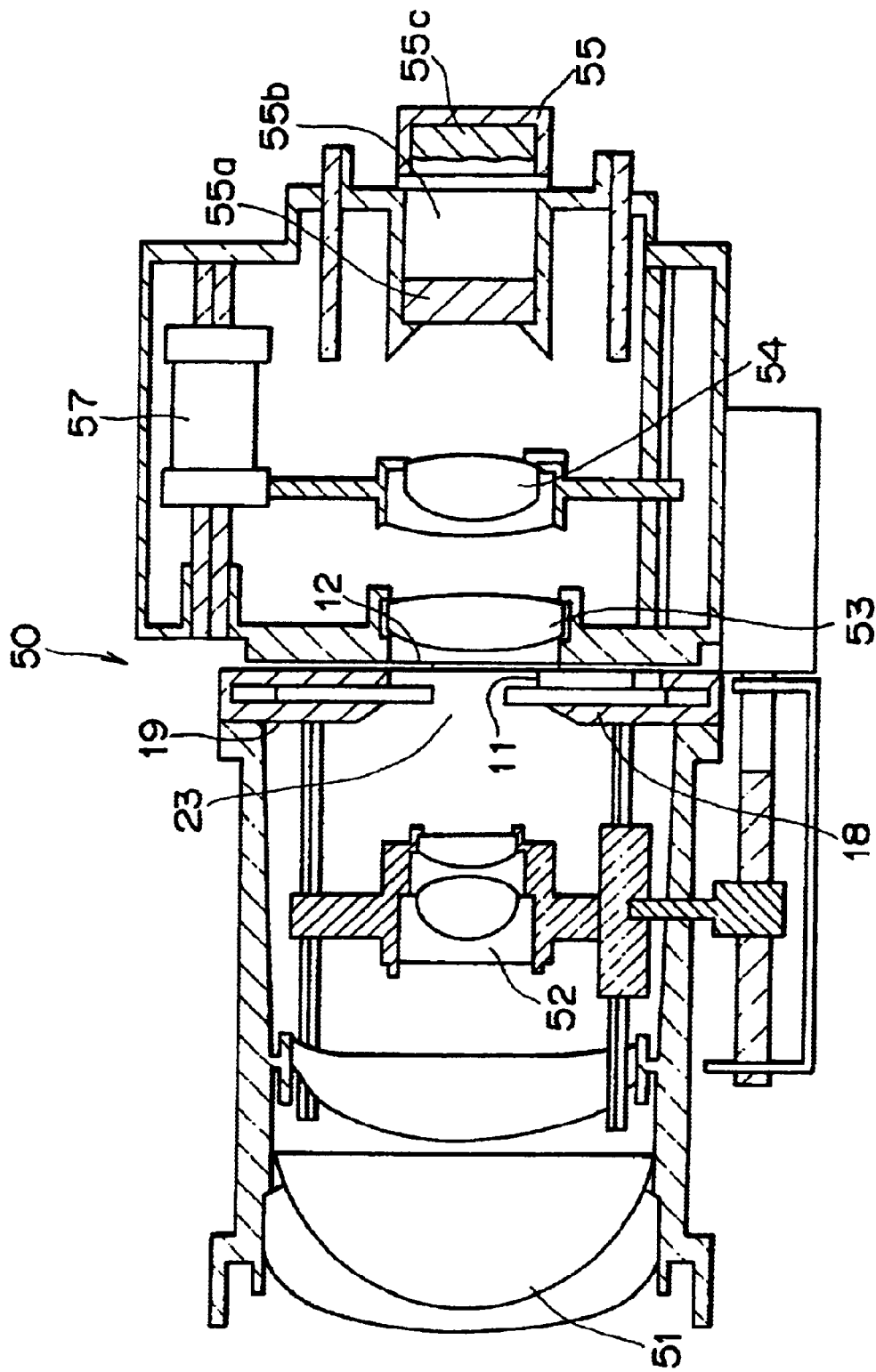
FIG. 12 is a schematic sectional view of a camera system building the light control device therein according to the invention.

FIG. 12 shows an example where the light control device 23 obtained by the above examples is assembled in a CCD (charge coupled device) camera.

More particularly, a CCD camera 50 includes, along an optical axis indicated by the dot-and-dash line, a first group of lenses 51 corresponding to the afore-indicated front group lenses and a second group of lenses 52 (for zooming), a third group of lenses 53 and a fourth group of lenses 53 (for focussing) corresponding to the afore-indicated rear group lenses, and a CCD package 55, which are provided in this order at appropriate intervals. The CCD package 55 accommodates therein an infrared cut filter 55a, an optical low pass filter 55b and a CCD pickup element 55c.

Such a light control device 21 as set out hereinabove and based on the invention, which is composed of the GH cell 12 and the polarizer 11, is attached on the light path between the second group lenses 32 and the third group of lenses 53 and nearer to the third group of lenses 53. It should be noted that the fourth group of lenses 54 are provided movably along the light path and between the third group of lenses 53 and the CCD package by means of a linear motor 57 and that the second group of lenses 52 are provided movably along the light path and between the first group of lenses 51 and the light control device 23.

Figure 13:
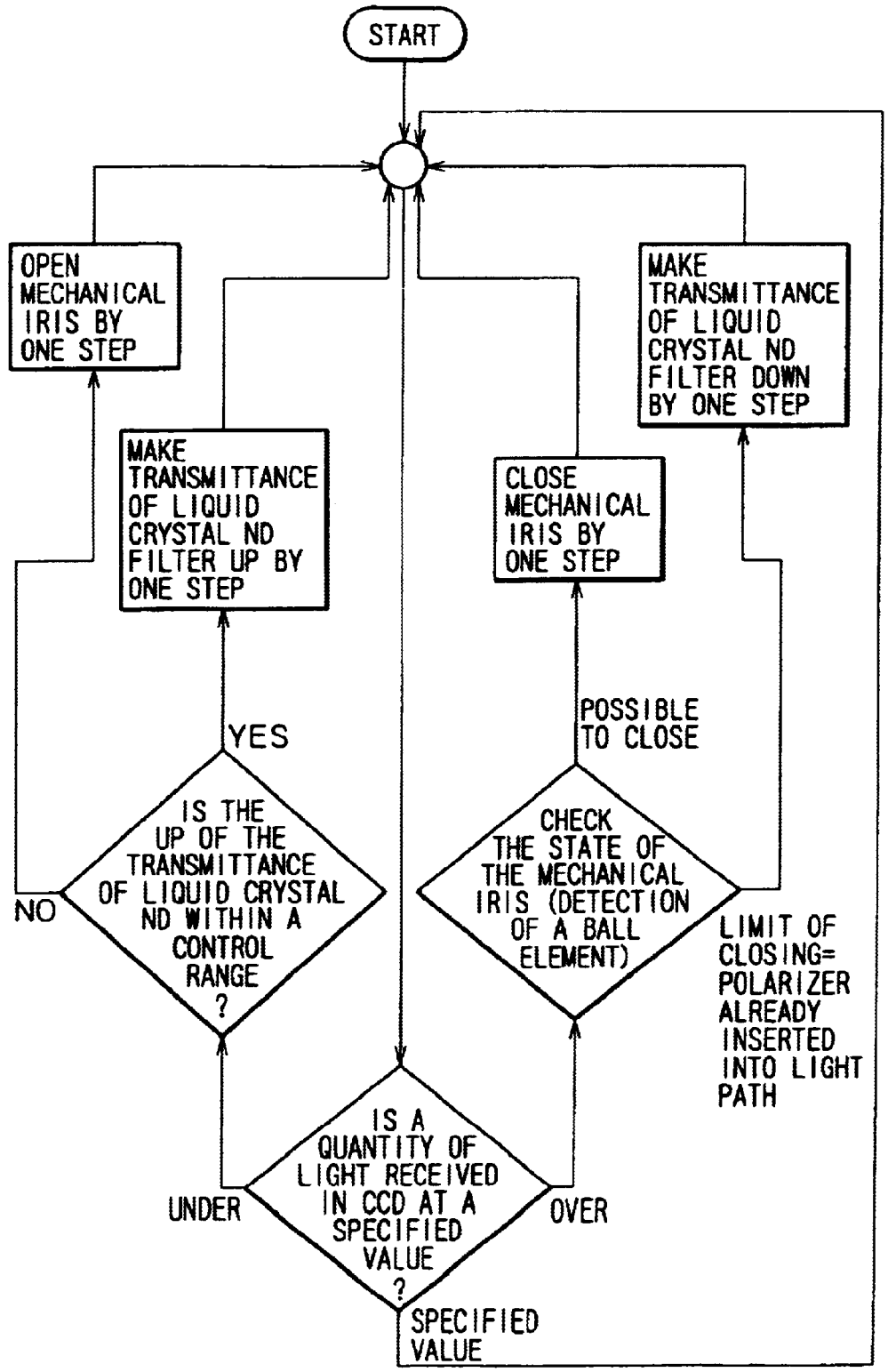
FIG. 13 is an algorithm showing the control of light transmittance in the camera system.

FIG. 13 shows an algorithm of a sequence of controlling a light transmittance according to the light control device 23 in this camera system.

In this example, the light control device 23 of the invention is provided between the second group lenses 52 and the third group of lenses, so that the quantity of light can be controlled by application of an electric field as stated hereinabove. Thus, the system can be made small in size and can be miniaturized substantially to an extent of an effective range of the light path. Accordingly, it is possible to achieve the miniaturization of the CCD camera. The quantity of light can be appropriately controlled by the magnitude of a voltage applied to the patterned electrodes, so that the diffraction phenomenon as conventionally experienced can be prevented, and an amount of light sufficient for a pickup element can be passed, thereby preventing an image from being out of focus The embodiments and examples of the invention have been described hereinabove, and these examples may be varied and modified in various forms based on the technical concept of the invention.

For instance, the cell gap of the liquid crystal element can be at least changed within a range of 2 to 4 μm in an effective light path, preferably from 2 to 3.5 μm, and more preferably from 2 to about 3 μm. The cell gap around the peripheral portion of the cell may be within a range of 2 to 4 μm, preferably 3.5 to 4 μm and may exceed 4 μm in some cases.

The structure of and the type of material for a polarizer, and the drive mechanism thereof may be changed into various forms. The drive waveform may be a rectangular wave, a trapezoidal wave or a sine wave, and the inclination of liquid crystal molecules is changed depending on the difference in potential between electrodes thereby controlling a light transmittance. Accordingly, the transmittance is usually controlled by this peak value. In the above examples, an instance using of pulse voltage modulation (PHM) is shown as a method of driving the liquid crystal cell. The cell may be driven by pulse width modulation (PWM).

Aside from those set out hereinbefore, a GH cell having a two-layered structure may be used. The position of the polarizer 11 relative to the GH cell 12 has been set between the front group lenses 15 and the rear group lenses 16, and is not limited thereto and may be optimally set in view of the setting conditions of pickup lenses. More particularly, so far as there is not used an optical element such as a phase difference film, wherein a polarization condition changes, the polarizer 11 may be located at an arbitrary position, for example, between the pickup face 17 and the rear group lenses 16 or at a side of a subject or at a side of the pickup element. Moreover, the polarizer may be located before or after a single lens that is used in place of the front group lenses 15 or the rear group lenses 16.

The iris blades 18, 19 may not be limited to two blades but may be made of a greater number of blades or may be made of only one blade. In addition, the iris blades 18, 19 are superposed through vertical movements thereof and may be moved in other directions or may be closed or stopped down from the periphery toward the center.

The polarizer 11 is attached to the iris blade 18 and may be attached to the iris blade 19.

As a subject becomes brighter, the polarizer is initially taken out or in to control the light, followed by absorption of the light with the GH cell 12. In contrast, it may be possible to initially control the light by absorption of the light with the GH cell 12. In this case, after the transmittance through the GH cell 12 is lowered to a given value, the light is controlled by the polarizer 11 being taken out or in.

The mechanical iris is used as the means for the polarizer 11 being taken out or in from the effective light path 20 and is not limited thereto. For instance, a film attached with the polarizer 11 may be attached directly to a drive motor so that the polarizer 11 may be taken out or in.

In the above examples, the polarizer 11 is taken out or in relative to the effective light path 20, and may be fixed into position in the effective light path.

The light control device of the invention may be used in combination with other types of known filter materials (e.g. an organic electrochromic material, a liquid crystal, an electroluminescent material and the like).

Further, the light control device of the invention may be widely applied, aside from an optical diaphragm of a pickup device such as the CCD camera illustrated hereinbefore, to light control, for example, of electrophotographic duplicators, optical communication machines and the like. Moreover, the light control device of the invention may be applied, aside from an optical diaphragm or a filter, to various types of image displays capable of displaying characters or images.

Thus, according to the invention, the light control device and pickup device include a guest-host type liquid crystal element arranged in a light path and make use of a negative type liquid crystal as a host material, and thus, the light transmittance under light-transmitting (especially, transparent) conditions is greatly improved over the case where a positive type liquid crystal is employed. In addition, because the cell gap is defined within a range of 2 $\mu$m to 4 $\mu$m, at least, in an effective light path, a response speed can be made great while keeping a high optical density ratio (contrast ratio) between those densities under light-transmitting (transparent) conditions and light-intercepting (light-shielding) conditions.

What is claimed is:

1. A light control device comprising:
   a liquid crystal including a liquid crystal cell having a liquid crystal sealed between opposing substrates; and
   a gap between said substrates at least in an effective light path ranges from 2 $\mu$m to 4 $\mu$m and wherein said gap in said liquid crystal cell at a central portion is smaller than a gap in said liquid crystal cell at a peripheral portion, and wherein the gap in the liquid crystal cell gradually changes from a wider distance near the perimeter of the display to a more narrow gap in the central portion of the display.

2. A light control device according to claim 1, wherein the gap between said substrates ranges from 2 $\mu$m to about 3 $\mu$m.

3. A light control device according to claim 1, wherein said liquid crystal cell includes a spacer between opposing transparent substrates, each having a transparent electrode and an alignment film, and said liquid crystal cell is sealed with a sealing material around a periphery thereof: and
   said sealing material is formed to have a diameter larger than said spacer or contains a hard material.

4. A light control device according to claim 3, wherein said hard material is in a form of balls or fibers.

5. A light control device according to claim 1, wherein a guest material of said liquid crystal is made of a dichromatic dye.

6. An image pickup device comprising:
   a light control device having a liquid crystal optical element including a liquid crystal cell having a liquid crystal sealed between opposing substrates. said light control device being disposed in a light path; and
   a gap between said substrates at least in an effective light path ranges from 2 $\mu$m to 4 $\mu$m and wherein said gap in said liquid crystal cell at a central portion is smaller than a gap in said liquid crystal cell at a peripheral portion, and wherein the gap in the liquid crystal cell gradually changes from a wider distance near the perimeter of the display to a more narrow gap in the central portion of the display.

7. An image pickup device according to claim 6, wherein the gap between said substrates ranges from 2 $\mu$m to about 3 $\mu$m.

8. An image pickup device according to claim 6, wherein said liquid crystal cell includes a spacer between opposing transparent substrates, each having a transparent electrode and an alignment film, and said liquid crystal cell is sealed with a sealing material around a periphery thereof; and
   said sealing material is formed to have a diameter larger than said spacer or contains a hard material.

9. An image pickup device according to claim 6, further including hard material balls or fibers between the substrates.

10. An image pickup device according to claim 6, wherein a guest material of said liquid crystal is made of a dichromatic dye.

* * * * *